US012695638B2

(12) United States Patent
Fox et al.

(10) Patent No.: US 12,695,638 B2
(45) Date of Patent: Jul. 28, 2026

(54) OUTSTANDING REQUESTS RELATED TO AN UPCOMING MEETING

(71) Applicant: Salesforce, Inc., San Francisco, CA (US)

(72) Inventors: J. Kris Fox, Arroyo Grande, CA (US); Steighton Haley, San Francisco, CA (US); Alexander Oscherov, Danville, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/543,699

(22) Filed: Dec. 6, 2021

(65) Prior Publication Data

US 2023/0179438 A1     Jun. 8, 2023

(51) Int. Cl.
*H04L 12/18*        (2006.01)
*H04L 51/212*       (2022.01)

(52) U.S. Cl.
CPC ........ *H04L 12/1818* (2013.01); *H04L 51/212* (2022.05)

(58) Field of Classification Search
None
See application file for complete search history.

(56) References Cited

U.S. PATENT DOCUMENTS

| | | | |
|---|---|---|---|
| 7,730,478 B2 | 6/2010 | Weissman | |
| 8,838,708 B1 * | 9/2014 | Rhodes ................. | H04L 51/212 |
| | | | 709/221 |
| 2010/0083149 A1 * | 4/2010 | McCaffrey ........... | G06Q 10/107 |
| | | | 715/764 |
| 2014/0033071 A1 * | 1/2014 | Gruber ................. | G06F 3/0482 |
| | | | 715/752 |
| 2014/0081685 A1 * | 3/2014 | Thacker ................ | G06F 16/245 |
| | | | 705/7.12 |
| 2017/0083590 A1 * | 3/2017 | Jagarlamudi ........ | G06Q 10/109 |
| 2019/0236555 A1 * | 8/2019 | Bennett ................... | G06F 30/27 |
| 2020/0005248 A1 * | 1/2020 | Gerzi ................. | G06Q 10/1097 |
| 2020/0125424 A1 * | 4/2020 | Subedi ................... | G06N 20/00 |
| 2021/0240712 A1 | 8/2021 | Oscherov et al. | |
| 2022/0345390 A1 | 10/2022 | Hajewski et al. | |
| 2023/0014775 A1 * | 1/2023 | Dotan-Cohen ....... | H04L 51/046 |

* cited by examiner

*Primary Examiner* — Kevin S Mai
(74) *Attorney, Agent, or Firm* — NICHOLSON DE VOS WEBSTER & ELLIOTT LLP

(57)        ABSTRACT

A method for meeting management that includes receiving an indicator of a user access of a meeting digest of a meeting, filtering communications of the user to identify communications received from a participant of the meeting, identifying at least one outstanding request from the participant or at least one unanswered communication from the participant, and generating a task for the meeting digest for the identified at least one outstanding request or the identified at least one unanswered communication.

15 Claims, 6 Drawing Sheets

USER SELECTS CUSTOMER OUTSTANDING RESPONSE OR REQUEST TASK — 401

IDENTIFY MOST RECENT COMMUNICATION IN COMMUNICATION CHAIN FOR MEETING — 403

INITIATE COMMUNICATION COMPOSER WITH COMMUNICATION CHAIN — 405

CLEAR OUTSTANDING RESPONSE OR REQUEST TASK — 407

OUTSTANDING REQUESTS RELATED TO AN UPCOMING MEETING

TECHNICAL FIELD

One or more implementations relate to the field of videoconferencing and automated productivity management; and more specifically, to processes and functions for automating preparation for meetings by identifying outstanding requests and responses in related emails.

BACKGROUND ART

Video teleconferencing software can work in conjunction with email systems to schedule video teleconferences. A user that seeks to set up a video teleconference or similar meeting, can initiate a meeting request via the video teleconferencing software or through supporting email systems. The meeting request can be sent to participants as an email that may include information about connecting to the video teleconference such as links, phone numbers, and similar connection information. The video teleconference and the email system can work together to manage meeting request invitations, acceptances, and scheduling.

A meeting request can record the meeting in a calendar maintained by the email system. The video teleconferencing software and email system can provide interfaces for viewing scheduling information from the calendars of participants to enable the participants to identify and agree on a particular time for holding the meeting. The video teleconferencing software and email system can send reminders of the meeting including information on joining the meeting. Similarly, if the meeting is rescheduled or similarly changed the email system can send notices to each of the participants.

Video teleconferences and similar meetings can be utilized for project development, client development, and similar purposes. In advance of these meetings and video teleconferences, the participants may exchange any number of emails to set an agenda and make requests from one another that are intended to be resolved before the meeting. With the high volume of emails that the participants each receive, however, these requests and tasks can be lost or overlooked. As a result, the participants can arrive at the meeting or video teleconference without having serviced these requests or completed these tasks causing the meeting to be less productive than if the requests and tasks were completed in advance.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
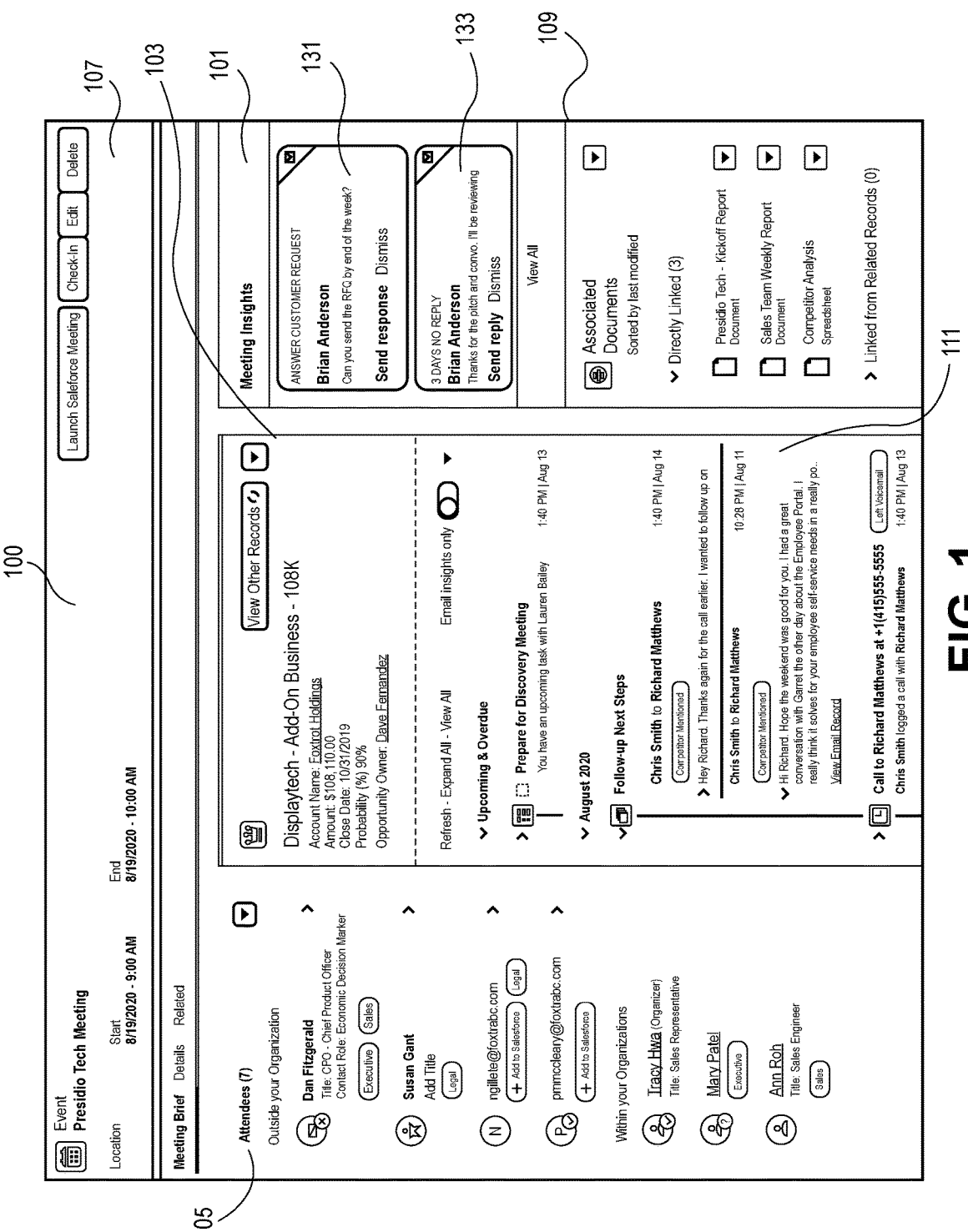
FIG. 1 is a diagram of a user interface of meeting digest according to some example implementations.

The following description describes implementations for meeting preparation functions that generate tasks that are accessible via meeting digests in a user interface for a platform that incorporates an implementation. When a user of a given platform or application has an upcoming meeting the user often needs to perform certain tasks to be prepared for that meeting. Performing these tasks relies on knowing what communications the user has had with the participants of the upcoming meeting and whether or not any of the communications contained any request for information, a follow up, pricing information, or similar request for a task to be performed before the meeting or a response to be offered during the meeting.

The implementations provide methods to identify and organize the tasks to be performed by the user for the meeting and by which the user can be better prepared when entering that meeting. The example implementations provide a set of tasks functions that can be integrated into or called by an application or platform to provide a way to tag incoming communications (e.g., emails) or identify previously received user communications as being in a category of task referred to as an outstanding request or outstanding response. A 'set,' as used herein, can refer to any positive whole number of items including one item.

Using this categorization, the task functions can query for any emails that have been received by a user that are labeled as an outstanding request or outstanding response. The communications can be filtered in various ways to identify relevant outstanding requests and outstanding responses such as filtering the communications to be relevant for tasks to those that have not been replied-to in the last 7 days or similar period. The example implementations can also filter these communications to those only relevant to the given meeting. This means that the implementations search or filter for communications that are sent by any of the external participants in that meeting. If, given this filter criteria, a list of relevant communications is generated, the implementations provide a method by which the user, when viewing the details of their meeting, can then see those communications and be ready to answer any requests made during that meeting or to reply to these communications to complete the requests or respond to the communications in advance of the meeting.

In implementations of meeting scheduling communication clients highlight communications that have been sent to the user, but the user has not replied within in a given timeframe. The example implementations can also include the identification of this category of communications. However, the implementation further parses the communications to gain additional information as to whether or not the communication needs to be replied to. The implementations not only highlight communications that have an outstanding request of some sort in the language therein, but also the implementations then link only these communications that are identified as relevant to a given meeting. Thus, the implementations provide advantages over extant systems by identifying and making easily accessible via a meeting digest those communications that include outstanding requests and that have a tie with the given meeting, associated participants, and their connections with other applications.

FIG. 1 is a diagram of a user interface of meeting digest according to some example implementations. The diagram illustrates a user interface 100 for an application that includes the management of meetings such as video conferences, in-person meetings, or similar events. The application can be a calendar, time tracking, communication, customer relation management, or similar application. In the illustrated example, a meeting 107 has been scheduled for a particular time, date, and duration. The meeting 107 can include further information such as a title for the meeting, a link or user interface element to initiate the video teleconference, and similar features for managing the meeting 107. The application can also track and manage other information relevant to the meeting 107. In the example implementations, the application can track attendees 105, organization information 103, meeting tasks 101, associated documents 109, related communications 111, and similar information.

The meeting attendees 105 can be established by an invitation and acceptance mechanism of the application that can be implemented using email or similar communication mechanism. Any number of attendees can be tracked. The attendees 105 can be grouped according to the associated organization, roles, or similar criteria. The listing of attendees 105 can provide details about each attendee drawn from a contacts database, or similar contacts tracking information of the application or accessible to the application such as contact information, role, name, online status, and similar information. The attendees 105 listing can include information about a response for each attendee to an invitation for the meeting 107 (i.e., accepted, rejected, unanswered, or similar designation). Additional information about each attendee can be accessible by selecting the user interface element for the attendee as displayed in the attendees 105 interface.

The user interface 100 of the application, also referred to herein as a meeting digest, can include organization information 103 that is drawn from a sales system or similar system that tracks client information, projects, and related information. A meeting can involve any number of entities including the organization of the user, clients of the user organization, vendors of the user organization, collaborating organizations, independent individuals, and other possible participants in the meeting 107. The organization information 103 can include any range and amount of information about each of the participating organizations. In the illustrated example, the application is a sales platform and client information such as the name of the client, account name, account value, sales information, and similar information can be present for each of the organizations associated with at least one attendee that is external to the user organization.

In some implementations, associated emails or communications 111, documents, and related information are logged or listed for the meeting 107. The listing of emails or similar communications can be those with a specific title identifying or tied to the meeting, or that were in the chain of emails that included the meeting invitations or acceptances. A summary and categorization of the communications 111 can be provided such as a listing of the subject lines of the communication, a brief description or quotation from the communication, and similar information can be listed. In some implementations, where the application supports video teleconferencing, telephone communication, voice mail management, or similar functions, then these additional communication types and instances can also be listed if tied to the meeting by meeting date, description, identifier, participants, or similar correlating information.

The set of associated documents 109 can be those attached to communications that were exchanged and listed in the communications 111, as well as additional documents that are added by the user or other attendees. Any number, variety, and type of additional documents that are relevant to the meeting 107 can be listed in the associated documents 109.

A set of tasks 101, also referred to as 'insights,' can also be displayed by the application in the user interface 100. The tasks 101 can be an automatically generated list of tasks to be performed by the user in advance of or in relation to the meeting 107. Any number and variety of tasks 101 can be generated and listed in the user interface 100. While the tasks 101 can be listed in a meeting digest or meeting brief user interface 100 of the application as illustrate in the example of FIG. 1, one skilled in the art would appreciate that these tasks can be generated and made accessible to the user in any user interface of the application. The tasks 101 are generated based on the processing of communications related to the meeting 107 such as emails, instant messaging, chats, voicemails, texts, and similar communications that are accessible to the application or the task generation functions of the application. In some implementations, these tasks can be generated responsive to the receipt of ingesting of the communications by the application or task generation functions. In other implementations, the tasks 101 can be generated at the time that the user interface 100 is accessed or generated for the user such that the relevant accessible communications are processed and the tasks 101 generated for display in the user interface.

In the example implementation, two types of tasks 101 have been generated and displayed. A first task 131 is an outstanding request task. The second task 133 is an unanswered communication task. These two tasks are given by way of example and not limitation. These tasks 131, 133 can identify specific requests or communications that are outstanding or can identify groups thereof that relate to the meeting 107. Methods for generating the tasks 131, 133 are discussed further herein with relation to FIG. 3 while methods for resolving the tasks 131, 133 are discussed further herein with relation to FIG. 4.

While the tasks 131, 133 can be presented as user interface elements in the user interface 100 of an application, in some implementations, the tasks 131, 133 can be presented in multiple user interfaces and using multiple user interface mechanisms. Reminders about the tasks can be sent using any communication mechanism (e.g., email) where user interface elements that can be utilized to resolve the task are presented or made accessible (e.g., via a link). The user interface elements for the tasks 131, 133 can include interactive elements to trigger mechanisms for responses (e.g., opening a communication composition interface) or other mechanisms for resolving the tasks 131, 133. In the example of task 131, which is an outstanding request task, the user interface of the task 131 can be utilized to initiate a communication composition interface to send a communication (e.g., an email) with requested information e.g., a requested document. Similarly, the example task 133, which is an outstanding response request task, can be utilized to directly initiate a response to the communication (e.g., an email) by opening a composition interface that directly responds to the correlated correspondence (e.g., by including the chain of communication and designating the recipients).

Figure 2:
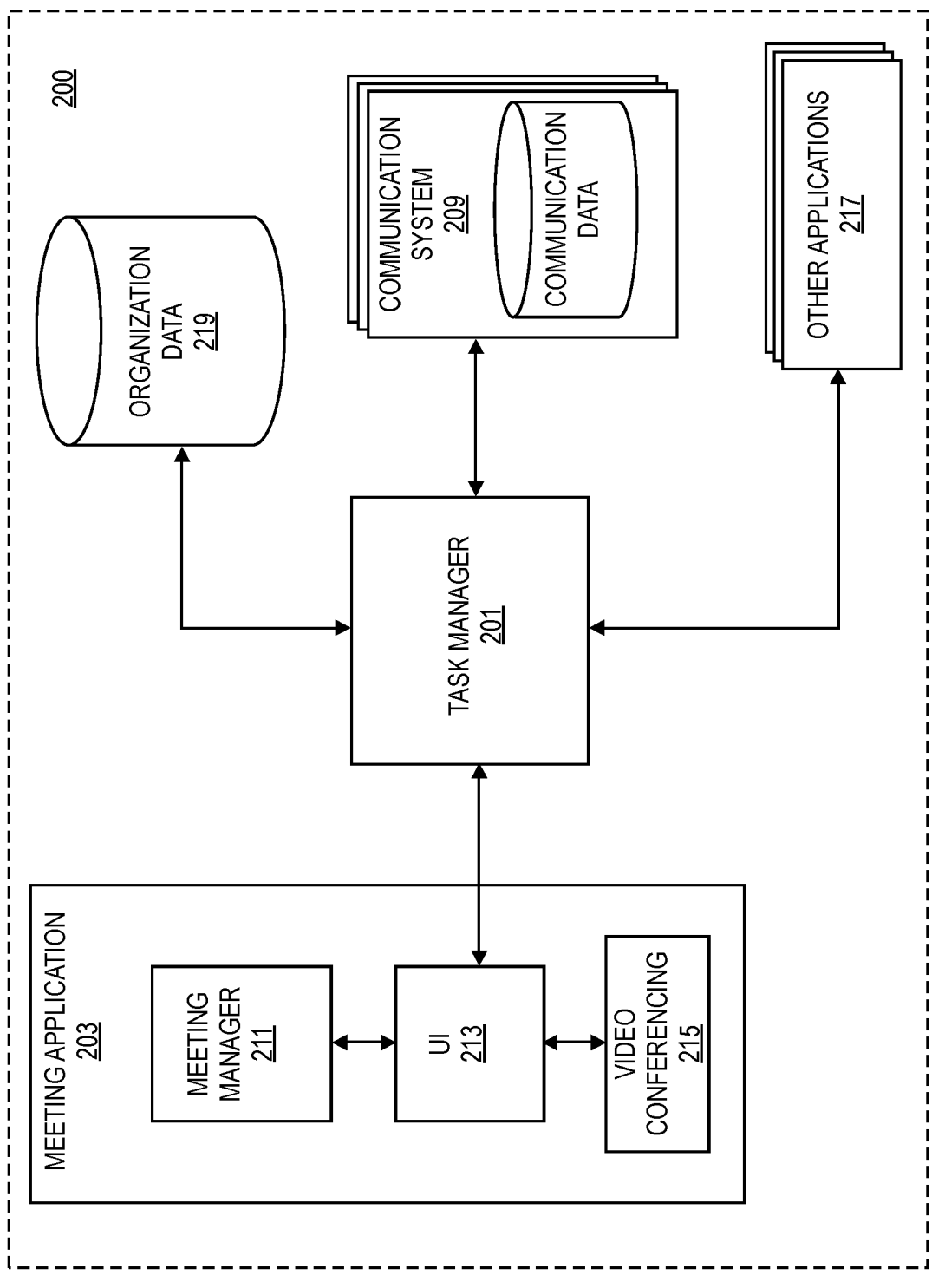
FIG. 2 is a diagram of a system architecture for managing meetings using tasks according to some example implementations.

FIG. 2 is a diagram of a system architecture for managing meetings using tasks according to some example implementations. The system 200 can be implemented as a set of computing devices, storage devices, networks, and related technologies. The system 200 can be implemented in a cloud environment, multi-tenant system, or similar systems and combinations thereof. Any number, variety, and quality of compute resources can be utilized in any combination to support the system 200. Similarly, any variety of technologies can be utilized to interconnect these compute resources along with storage resources in the system 200. The example implements can be described in terms of multi-tenant services and systems. These systems 200 are provided by way of example and illustration and not limitation.

The example implementation of system 200 can include a meeting application 203, task manager 201, communication system 209, as well as other applications 217, organization data 219, and related data storage and resources. These applications, services, and data stores can be located in a cloud and/or multi-tenant system or distributed over multiple systems.

The meeting application 203 can be an application that supports video teleconferencing services, in person meeting functions and services, related functions and services, and combinations thereof. The meeting application 203 can be a discrete application or can be a set of functions, modules, or components that are installed in or accessible to other applications or combinations thereof. The meeting application 203 can include a user interface (UI) component 213 that enables user access to the functions of the meeting application 203. The UI illustrated in FIG. 1 is an example of such a UI for a meeting application 203. The UI 213 can generate and respond to user interactions to execute the functions of the meeting application 203.

Video conferencing 215 services or components implement the exchange of audio/video signals between the participants during video conferencing as well as related functions that support the video conferencing 215 such as screen sharing, chatting, document sharing, and similar video conferencing features. In some implementations, a separate video conferencing application works in combination with the meeting application 203. Each of the participants in a meeting the includes a video conference can execute a client application for the video conferencing 215 or an instance of the meeting application 203 with video conferencing support.

A meeting manager 211 can manage the information related to the meeting including the information presented via the UI of the meeting application 203. The meeting manager 211 can interact with other components of the meeting application 203, as well as external functions such as the task manager 201, a set of supported communication systems 209, and similar system 200 resources. The meeting manager 211 can operate with the UI 213 to generate the meeting brief or digest as shown in the example of FIG. 1. The meeting manager 211 retrieves the requisite data for the meeting brief and queries the task manager 201 and other components of the system 200 to obtain the information needed to populate the meeting brief and facilitate the establishment of meetings including communications between the participant using the available communication systems 209.

A task manager 201 identifies and generates the tasks that populate the meeting brief or digest. The tasks can also be utilized or be made accessible in other UIs of the meeting applications 203 or other applications 217. The task manager 201 can be called by the meeting application 203 or other applications 217 to obtain the identified tasks for a given meeting or to initiate the generation of tasks for a given meeting. The task manager 201 can process the accounts of a user in the various communication systems 209. The task manager 201 can also access organization data 219 for the user or other participants of the meeting. The operation of the task manager 201 is further described herein with relation to the functions for generating new tasks (FIG. 3) and for handling a resolution of a task (FIG. 4).

Organization data 219 can be any variety, amount, complexity, or variety of data that belongs to a particular organization or tenant of the system 200 that can store any information of the organization depending on the function and capacities of the organization. In the example implementation of FIG. 1, the meeting application 203 is part of a sales application or service and the organization data 219 can include client account information that tracks sales, and similar data for each client. The task manager 201 can query this organization data 219 to obtain information about the meeting based on the participants, communications, and related data about the scheduled meeting being managed by the meeting application 203. Organization data 219 can be stored in any storage or database system using any format or organization of data.

The system 200 can include a set of communication systems 209. The set of communication systems 200 can include any number, variety, technology, or similar categorization of communication systems that are supported by or integrated with the system 200. In some example implementations, the system 200 can include communication systems 209 for email, chat, instant messaging, texting, voice (and voicemail)), and similar communication systems. Each communication system 209 can include a storage for communications of the user, organization, meeting participants, and similar entities associated with the meeting that is accessible by the task manager 201 to process and/or parse the communications of the user, participants, or other entities that are relevant to the meeting to identify tasks related to the meeting. The communication data for each user can be stored in varying formats, quantity, quality, using database technologies, e.g., relational database management system, logs, archives, and similar stores and combinations thereof for maintaining communication system records.

The system 200 can also include other applications in the system 200. In some example implementations, the system is a sales system (e.g., the Salesforce Sales Cloud) that facilitates a user in managing and building a set of sales with a set of clients. In other implementations other application types and functions can be present in the system 200 to facilitate the ultimate goal of the applications and system 200. The other applications 217 can in some implementations obtain tasks from the task manager 201 where the tasks are identified for display of the UI of the meeting application or by other components of the system 200.

Figure 3:
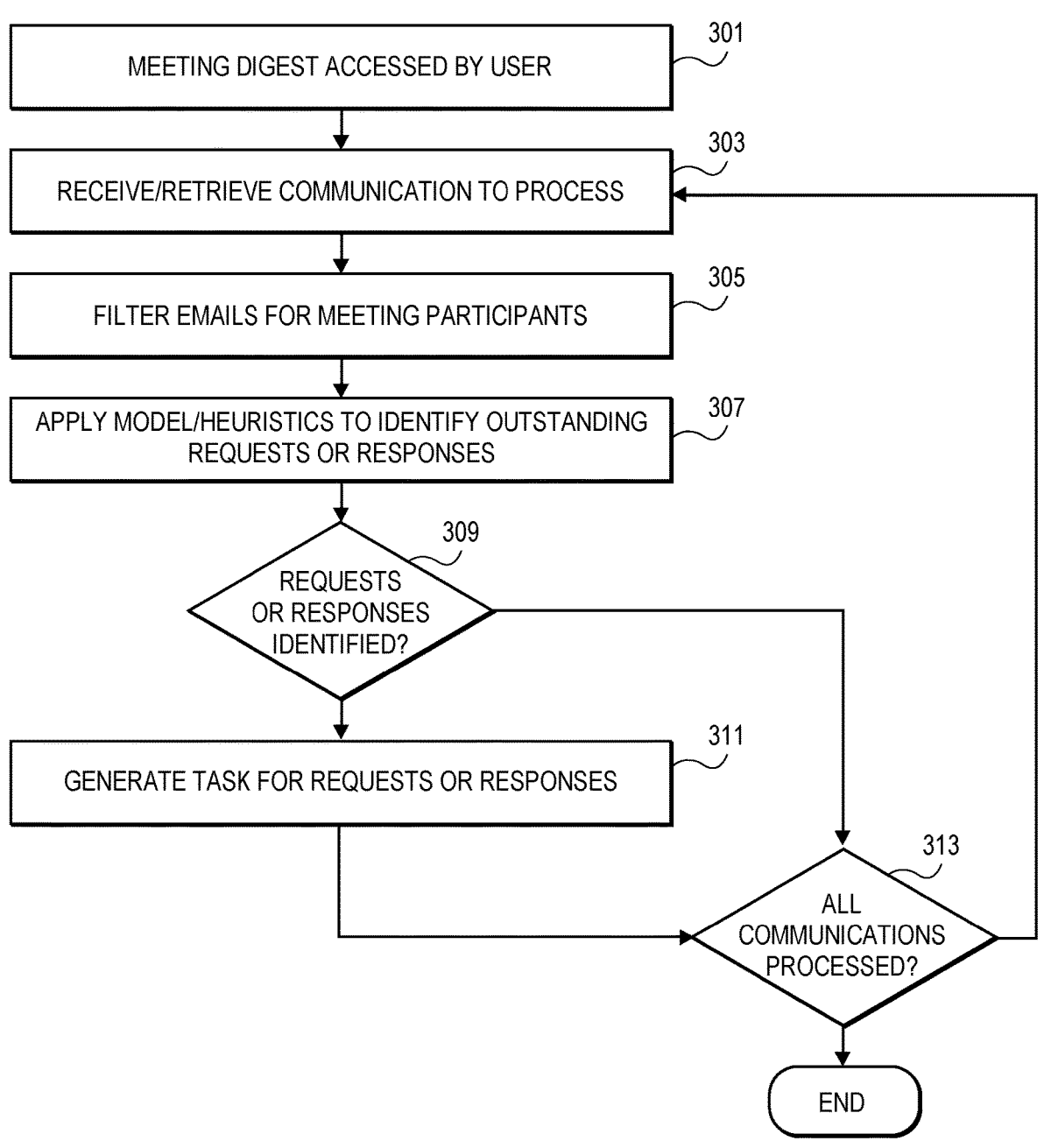
FIG. 3 is a flowchart of a process for generating tasks for outstanding requests and email responses according to some example implementations.
Figure 4:
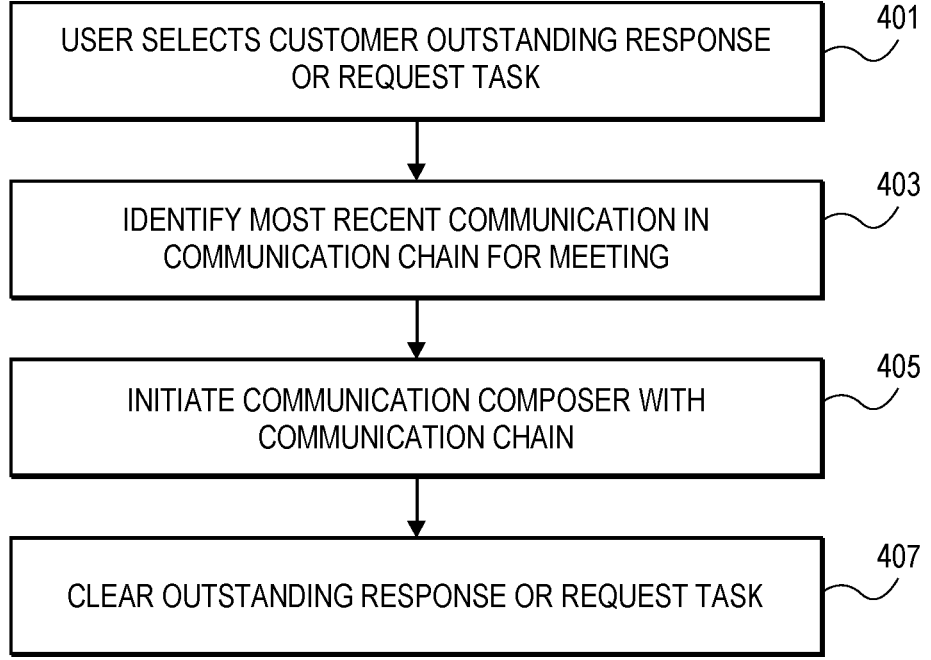
FIG. 4 is a flowchart of a process for resolving a task for outstanding requests and email responses according to some example implementations.

FIG. 3 is a flowchart of a process for generating tasks for outstanding requests and communication responses according to some example implementations. The process of identifying outstanding requests or communications can be triggered by receipt of new information that is to be stored by communication storage applications or related applications. In some implementations, the process is triggered when a meeting application calls a task manager 201 to populate a digest or meeting brief for the meeting. Subsequently, when a user accesses a meeting application, opens a meeting UI and is present with a meeting digest or brief, then user is presented with outstanding tasks (Block 301), which in turn causes the task manager to retrieve the relevant tasks on a per meeting and per user basis to be displayed as shown with the example implementation of FIG. 1.

As part of this process, the task manager can retrieve the communications of the participants of a meeting from each of the respective communication systems (Block 303). The communications from each communication system can be queried in a tailored manner by filtering the communications by user, participant, or similar entity (Block 305). The communications can be filtered on other criteria such as relevance in subject line or body of the communication, explicit identification by other users, and similar criteria to exclude unnecessary communications that are not relevant in the meeting.

In a further implementation, the task manager can apply machine learning models/training and similar processes to generate a heuristic process (i.e., as encoded using JavaScript or other programming language) to be applied to the identified and filtered set of communications (Block 307). Machine learning models can be trained on prior communication data sets with outstanding requests, unanswered questions, or communications. Various combinations of machine learning models, training data sets, and heuristic processes can be utilized in any combination thereof to identify those communications that either include unanswered requests for information or to identify those communication that have not been responded to. Any number and combination of machine learning models, heuristics, or similar programs can be applied to each batch of filtered communications to identify outstanding requests or responses (Block 309).

If requests or responses have been identified, then a task can be generated for the identified outstanding request or response (Block 309). If the tasks are generated at the time of ingestion of the communication or under similar circumstances, then the task can be generated and stored along with pointers or similar references to correlate the meeting with the task (Block 311). If the tasks are generated at the time that the meeting digest or brief is accessed or when the user accesses the UI interface for the meeting, then the generated tasks can be immediately and directly inserted in the UI interface that is being generated. This process can iteratively process the received or retrieved communications as they become available until all of the ingested communications are processed (Block 313). In some implementations, the processing of the communications can be done responsive to a user request (e.g., user access of the UI of the meeting), during communication ingest, or under similar circumstances.

FIG. 4 is a flowchart of a process for resolving a task for outstanding requests and communication responses according to some example implementations. In an example, the resolution process can be triggered by a user interaction with the generated task that is displayed by the meeting application (Block 401). In some implementations, the resolution mechanism trigger can be displayed on a surface or within the task UI mechanism. After the user selects an outstanding response or request task, then the task manager can identify a most recent communication in communication chain for the meeting that is correlated with the task (Block 403). The task manager can track correlations between meetings and tasks, specific communications associated with each service, either in a local tracking mechanism or in a larger relational database as a property or data of the meeting or task.

In some implementations, the task manager can initiate a communication composer with a communication chain for the outstanding response or request (Block 405). The user can then include the requested information, data, file, or other item, which upon sending to the requestor can cause the task to be resolved. A resolved task can be cleared from the user interface and any tracking structures managed by the task manager (Block 407). In some embodiments, where there is a task for an outstanding request, the task manager can parse or similarly process the respond communication to determine whether the actual requested information, file, or other item has been returned. If the requested item is found in the reply, then the outstanding request task can be cleared.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals-such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 5A:
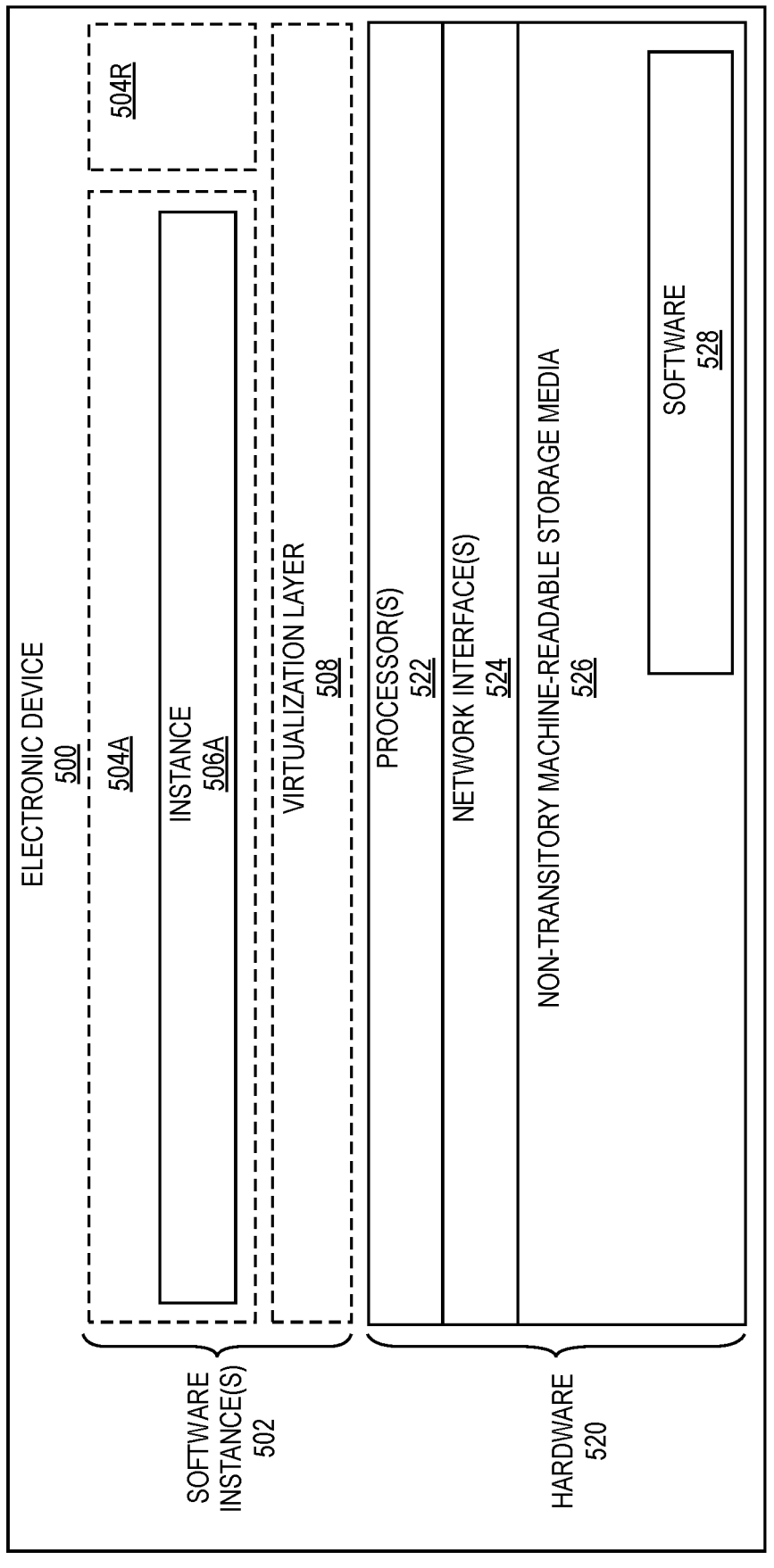
FIG. 5A is a block diagram illustrating an electronic device according to some example implementations.

FIG. 5A is a block diagram illustrating an electronic device 500 according to some example implementations.

FIG. 5A includes hardware 520 comprising a set of one or more processor(s) 522, a set of one or more network interfaces 524 (wireless and/or wired), and machine-readable media 526 having stored therein software 528 (which includes instructions executable by the set of one or more processor(s) 522). The machine-readable media 526 may include non-transitory and/or transitory machine-readable media. Each of the previously described clients and the task manager service may be implemented in one or more electronic devices 500. In one implementation: 1) each of the clients is implemented in a separate one of the electronic devices 500 (e.g., in end user devices where the software 528 represents the software to implement clients to interface directly and/or indirectly with the task manager service (e.g., software 528 represents a web browser, a native client, a portal, a command-line interface, and/or an application programming interface (API) based upon protocols such as Simple Object Access Protocol (SOAP), Representational State Transfer (REST), etc.)); 2) the task manager service is implemented in a separate set of one or more of the electronic devices 500 (e.g., a set of one or more server devices where the software 528 represents the software to implement the task manager service); and 3) in operation, the electronic devices implementing the clients and the task manager service would be communicatively coupled (e.g., by a network) and would establish between them (or through one or more other layers and/or or other services) connections for submitting a request for task information to the task manager service and returning tasks to the clients (e.g., outstanding request or response). Other configurations of electronic devices may be used in other implementations (e.g., an implementation in which the client and the task manager service are implemented on a single one of electronic device 500).

During operation, an instance of the software 528 (illustrated as instance 506 and referred to as a software instance; and in the more specific case of an application, as an application instance) is executed. In electronic devices that use compute virtualization, the set of one or more processor(s) 522 typically execute software to instantiate a virtualization layer 508 and one or more software container(s) 504A-504R (e.g., with operating system-level virtualization, the virtualization layer 508 may represent a container engine (such as Docker Engine by Docker, Inc. or rkt in Container Linux by Red Hat, Inc.) running on top of (or integrated into) an operating system, and it allows for the creation of multiple software containers 504A-504R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-504R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 528 is executed within the software container 504A on the virtualization layer 508. In electronic devices where compute virtualization is not used, the instance 506 on top of a host operating system is executed on the "bare metal" electronic device 500. The instantiation of the instance 506, as well as the virtualization layer 508 and software containers 504A-504R if implemented, are collectively referred to as software instance(s) 502.

Alternative implementations of an electronic device may have numerous variations from that described above. For example, customized hardware and/or accelerators might also be used in an electronic device.

Example Environment

Figure 5B:
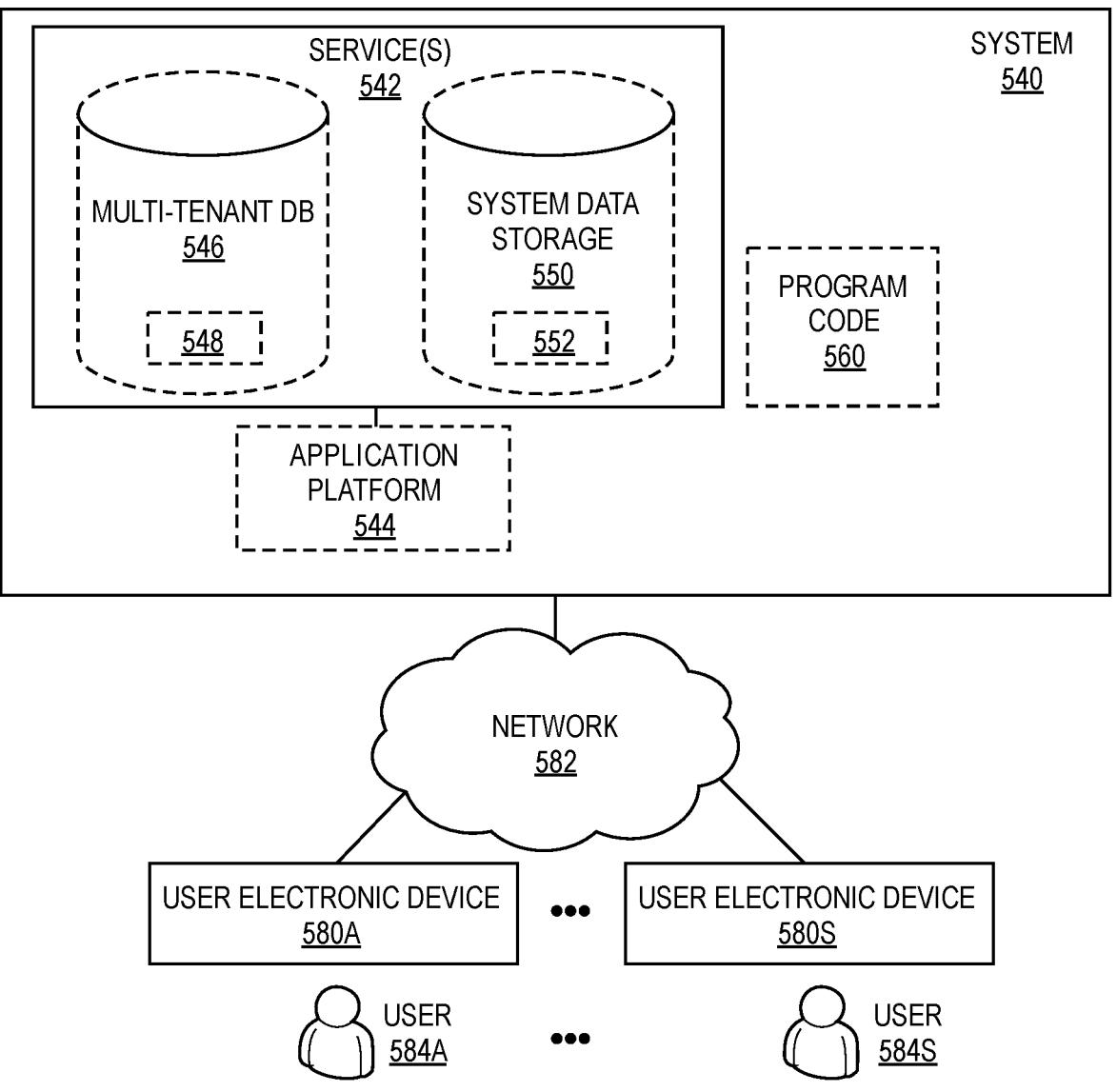
FIG. 5B is a block diagram of a deployment environment according to some example implementations.

FIG. 5B is a block diagram of a deployment environment according to some example implementations. A system 540 includes hardware (e.g., a set of one or more server devices) and software to provide service(s) 542, including the task manager service. In some implementations the system 540 is in one or more datacenter(s). These datacenter(s) may be: 1) first party datacenter(s), which are datacenter(s) owned and/or operated by the same entity that provides and/or operates some or all of the software that provides the service(s) 542; and/or 2) third-party datacenter(s), which are datacenter(s) owned and/or operated by one or more different entities than the entity that provides the service(s) 542 (e.g., the different entities may host some or all of the software provided and/or operated by the entity that provides the service(s) 542). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 540 is coupled to user devices 580A-580S over a network 582. The service(s) 542 may be on-demand services that are made available to one or more of the users 584A-584S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-584S). The service(s) 542 may communicate with each other and/or with one or more of the user devices 580A-580S via one or more APIs (e.g., a REST API). In some implementations, the user devices 580A-580S are operated by users 584A-584S, and each may be operated as a client device and/or a server device. In some implementations, one or more of the user devices 580A-580S are separate ones of the electronic device 500 or include one or more features of the electronic device 500.

In some implementations, the system 540 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 540 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IOT); Industry-specific; Artificial intelligence (AI); Application marketplace ("app store"); Data modeling; Security; and Identity and access management (IAM).

For example, system 540 may include an application platform 544 that enables PAAS for creating, managing, and executing one or more applications developed by the provider of the application platform 544, users accessing the system 540 via one or more of user devices 580A-580S, or third-party application developers accessing the system 540 via one or more of user devices 580A-580S.

In some implementations, one or more of the service(s) 542 may use one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user devices 580A-580S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the multi-tenant database(s) 546 and/or system data storage 550.

In some implementations, the service(s) 542 are implemented using virtual applications dynamically created at run time responsive to queries from the user devices 580A-580S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the task manager service, may be coded using Procedural Language/ Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 540 and the user devices 580A-580S.

Each user device 580A-580S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow one or more of users 584A-584S to interact with various GUI pages that may be presented to the one or more of users 584A-584S. User devices 580A-580S might communicate with system 540 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 580A-580S might include an HTTP client, commonly referred to as a "browser," for sending and receiving HTTP messages to and from server(s) of system 540, thus allowing users 584A-584S of the user devices 580A-580S to access, process and view information, pages and applications available to it from system 540 over network 582.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method comprising:

receiving an indicator of a user access of a meeting digest of a meeting;

responsive to receiving the indicator of the user access, filtering emails of the user only, to identify emails received from one or more participants of the meeting;

identifying, from the filtered emails, at least one outstanding request from a participant of the one or more participants or at least one unanswered email from the participant; and generating a task to be displayed on the meeting digest for the identified at least one outstanding request or the identified at least one unanswered email;

receiving a selection of the task from a set of tasks within the meeting digest by the user;

based on the selection, identifying a most recent email from the filtered emails of the user and initiating an email composer for the user to create an email response to include one or more requested items responsive to the most recent email; and clearing the task from the set of tasks within the meeting digest upon determining that the created email response has included the requested one or more items.

2. The method of claim 1, wherein identifying the at least one outstanding request further comprising:

applying a machine learning model trained with communications containing requests to the filtered emails of the user.

3. The method of claim 1, wherein filtering emails of the user further comprising:

filtering the emails of the user to identify emails received from the participant where the participant is external to an organization of the user.

4. The method of claim 1, wherein filtering emails of the user further comprising:

filtering the emails of the user to identify emails received from the participant where the participant has a specified role in an organization of the participant.

5. The method of claim 1, wherein filtering emails of the user further comprising:

filtering the emails of the user to identify emails mentioning the meeting or sharing a subject of the meeting.

6. A non-transitory machine-readable storage medium that provides instructions that, if executed by a set of one or more processors, are configurable to cause the set of one or more processors to perform operations comprising:

receiving an indicator of a user access of a meeting digest of a meeting;

responsive to receiving the indicator of the user access, filtering emails of the user only, to identify emails received from one or more participants of the meeting;

identifying, from the filtered emails, at least one outstanding request from a participant of the one or more participants or at least one unanswered email from the participant; and generating a task to be displayed on the meeting digest for the identified at least one outstanding request or the identified at least one unanswered email;

receiving a selection of the task from a set of tasks within the meeting digest by the user;

based on the selection, identifying a most recent email from the filtered emails of the user and initiating an email composer for the user to create an email response to include one or more requested items responsive to the most recent email; and clearing the task from the set of tasks within the meeting digest upon determining that the created email response has included the requested one or more items.

7. The non-transitory machine-readable medium of claim 6, wherein identifying the at least one outstanding request further comprising:

applying a machine learning model trained with emails containing requests to the filtered emails of the user.

8. The non-transitory machine-readable medium of claim 6, wherein filtering emails of the user further comprising:

filtering the emails of the user to identify emails received from the participant where the participant is external to an organization of the user.

9. The non-transitory machine-readable medium of claim 6, wherein filtering emails of the user further comprising:

filtering the emails of the user to identify emails received from the participant where the participant has a specified role in an organization of the participant.

10. The non-transitory machine-readable medium of claim 6, wherein filtering emails of the user further comprising:

filtering the emails of the user to identify emails mentioning the meeting or sharing a subject of the meeting.

11. An apparatus comprising: a set of one or more processors; and a non-transitory machine-readable storage medium that provides instructions that, if executed by the set of one or more processors, are configurable to cause the apparatus to perform operations comprising, receiving an indicator of a user access of a meeting digest of a meeting, responsive to receiving the indicator of the user access, filtering emails of the user only, to identify emails received from one or more participants of the meeting, identifying, from the filtered emails, at least one outstanding request from a participant of the one or more participants or at least one unanswered email from the participant, and generating a task to be displayed on the meeting digest for the identified at least one outstanding request or the identified at least one unanswered email, receiving a selection of the task from a set of tasks within the meeting digest by the user, based on the selection, identifying a most recent email from the filtered emails of the user and initiating an email composer for the user to create an email response to include one or more requested items responsive to the most recent email, and clearing the task from the set of tasks within the meeting digest upon determining that the created email response has included the requested one or more items.

12. The apparatus of claim 11, wherein identifying the at least one outstanding request further comprising:

applying a machine learning model trained with emails containing requests to the filtered emails of the user.

13. The apparatus of claim 11, wherein filtering emails of the user further comprising:

filtering the emails of the user to identify emails received from the participant where the participant is external to an organization of the user.

14. The apparatus of claim 11, wherein filtering emails of the user further comprising:

filtering the emails of the user to identify emails received from the participant where the participant has a specified role in an organization of the participant.

15. The apparatus of claim 11, wherein filtering emails of the user further comprising:

filtering the emails of the user to identify emails mentioning the meeting or sharing a subject of the meeting.

* * * * *